United States Patent
Yoon et al.

(10) Patent No.: US 11,450,894 B2
(45) Date of Patent: Sep. 20, 2022

(54) LITHIUM METAL SECONDARY BATTERY HAVING IMPROVED SAFETY AND BATTERY MODULE INCLUDING THE SAME

(71) Applicants: LG CHEM, LTD., Seoul (KR); Korea Advanced Institute of Science and Technology, Daejeon (KR)

(72) Inventors: Jong-Keon Yoon, Daejeon (KR); Kyung-Hwa Woo, Daejeon (KR); Hyun-Jun Choi, Daejeon (KR); Hye-Jin Lee, Daejeon (KR); Hoe-Jin Hah, Daejeon (KR); Hee-Tak Kim, Anyang-si (KR); Young-Il Roh, Yangsan-si (KR); Hyun-Soo Jin, Seoul (KR)

(73) Assignees: LG ENERGY SOLUTION, LTD., Seoul (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 168 days.

(21) Appl. No.: 16/756,683

(22) PCT Filed: May 10, 2019

(86) PCT No.: PCT/KR2019/005667
§ 371 (c)(1),
(2) Date: Apr. 16, 2020

(87) PCT Pub. No.: WO2019/216713
PCT Pub. Date: Nov. 14, 2019

(65) Prior Publication Data
US 2020/0243919 A1   Jul. 30, 2020

(30) Foreign Application Priority Data
May 10, 2018  (KR) .................. 10-2018-0053846

(51) Int. Cl.
| | | |
|---|---|---|
| *H01M 10/42* | (2006.01) | |
| *H01M 4/137* | (2010.01) | |
| *H01M 10/052* | (2010.01) | |
| *H01M 10/0565* | (2010.01) | |
| *H01M 50/46* | (2021.01) | |
| *H01M 4/02* | (2006.01) | |

(52) U.S. Cl.
CPC ....... *H01M 10/4235* (2013.01); *H01M 4/137* (2013.01); *H01M 10/052* (2013.01); *H01M 10/0565* (2013.01); *H01M 50/46* (2021.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2004/0058232 A1 | 3/2004 | Kim et al. | |
| 2011/0244324 A1 | 10/2011 | Jang | |
| 2012/0214043 A1* | 8/2012 | Olschimke | H01M 10/05 |
| | | | 558/260 |
| 2013/0280584 A1 | 10/2013 | Matsumura | |
| 2014/0170478 A1 | 6/2014 | Liao et al. | |
| 2014/0225041 A1* | 8/2014 | Archer | C04B 35/524 |
| | | | 252/503 |
| 2015/0014890 A1* | 1/2015 | Xiao | H01M 4/0471 |
| | | | 264/29.1 |
| 2015/0255782 A1* | 9/2015 | Kim | H01M 4/366 |
| | | | 429/231.95 |
| 2016/0336625 A1* | 11/2016 | Jeong | H01M 50/457 |
| 2016/0351873 A1 | 12/2016 | Sasaki | |
| 2016/0372743 A1* | 12/2016 | Cho | H01M 4/62 |
| 2017/0324097 A1 | 11/2017 | Lee et al. | |
| 2021/0344006 A1* | 11/2021 | Yoon | H01M 4/382 |

FOREIGN PATENT DOCUMENTS

| | | |
|---|---|---|
| JP | 5967731 B2 | 2/2016 |
| KR | 10-2015-0062084 A | 6/2015 |
| KR | 10-2015-0106253 A | 9/2015 |
| KR | 10-2016-0034082 A | 3/2016 |
| KR | 10-2016-0137516 A | 11/2016 |
| KR | 10-2017-0126404 A | 11/2017 |

OTHER PUBLICATIONS

Machine translation of KR10-2015-0062084, published on Jun. 5, 2015 (Year: 2015).*
Zhao, Y, Li, G., Gao, Y, Wang, D., Huang, Q., Wang, D.-Stable Li Metal Anode by a Hybrid Lithium Polysulfidophosphate/Polymer Cross-Linking Film, ACS Energy Lett, 2019, pp. 1271-1278, published on Apr. 30, 2019 (Year: 2019).*
European Search Report dated Mar. 4, 2021 in corresponding EP Application No. 19800698.3.
Cheng et al., "Sulfurized solid electrolyte interphases with a rapid Li+ diffusion on dendrite-free Li metal anodes," Energy Storage Materials, vol. 7, 2017, pp. 1-7.

(Continued)

*Primary Examiner* — Anca Eoff
(74) *Attorney, Agent, or Firm* — Birch, Stewart, Kolasch & Birch, LLP

(57) ABSTRACT

A lithium metal secondary battery including: an electrode assembly including a positive electrode, a lithium metal negative electrode, a separator interposed between the positive electrode and the lithium metal negative electrode, a protective layer interposed between the lithium metal negative electrode and the separator; and a non-aqueous electrolyte injected to the electrode assembly, wherein the protective layer includes a polymer having a sulfur chain group. A battery module including the lithium metal secondary battery is also disclosed.

10 Claims, 2 Drawing Sheets

(56) References Cited

OTHER PUBLICATIONS

International Search Report (PCT/ISA/210) issued in PCT/KR2019/005667, dated Aug. 28, 2019.
Ling et al., "Nucleophilic substitution between polysulfides and binders unexpectedly stabilizing lithium sulfur battery," Nano Energy, vol. 38, 2017, pp. 82-90.

* cited by examiner

LITHIUM METAL SECONDARY BATTERY HAVING IMPROVED SAFETY AND BATTERY MODULE INCLUDING THE SAME

CROSS-REFERENCE TO RELATED APPLICATIONS

The present application is a National Stage entry under 37 U.S.C 371 of the International Patent Application No. PCT/KR2019/005667 filed on May 10, 2019, which claims benefit of the KR application No. 10-2018-0053846 filed on May 10, 2018 in the Republic of Korea.

TECHNICAL FIELD

The present disclosure relates to a lithium metal secondary battery having improved safety and a battery module including the same. More particularly, the present disclosure relates to a lithium metal secondary battery having improved safety and including a protective layer having a self-healing function, and a battery module including the same.

BACKGROUND ART

Currently, lithium secondary batteries are used in most portable electronic instruments by virtue of their excellent performance, such as high energy density and long life characteristics. However, as the market of middle- to large-scale batteries for electric vehicles and large-capacity energy storage systems has grown, there has been a need for next-generation lithium secondary batteries having higher energy density as compared to the existing lithium ion batteries.

As next-generation lithium secondary batteries having high capacity and high energy are desired, batteries using lithium metal as a negative electrode have been spotlighted. Typical examples of such batteries include a lithium metal battery, lithium sulfur battery and a lithium-air battery. Since lithium metal used as a negative electrode has a low density (0.54 g/cm$^3$) and a low standard reduction potential (−3.045V, based on the standard hydrogen electrode), it is possible to realize high capacity and high density per volume (or weight).

However, a lithium metal secondary battery has serious problems, such as formation of lithium dendrite and low Coulombic efficiency. During the electrochemical cycles of a battery, dendritic lithium (lithium dendrite) and dead lithium are formed at the lithium metal negative electrode, which causes loss of the active material. In addition, lithium metal having high reactivity forms a solid electrolyte interface (SEI) layer on the surface through reactions with an electrolyte and residual water. Herein, the SEI layer is repeatedly broken and formed again due to an increase in surface area of the electrode caused by formation of dendrite and dead lithium. Therefore, lithium metal and the electrolyte are consumed continuously, which results in low Coulombic efficiency of the lithium metal negative electrode and short cycle life. In addition, when lithium dendrite penetrates through a separator and is grown, an internal short-circuit occurs, leading to safety problems, such as fire accidents, explosion, or the like.

Therefore, it is required to inhibit the growth of lithium dendrite and to improve reversibility of the lithium metal negative electrode in order to realize a lithium metal battery having high performance and high safety.

According to the related art, it has been reported that a lithium metal negative electrode including an in-situ passivation layer (SEI layer) or ex-situ protective layer introduced thereto shows effects of inhibiting dendrite growth and providing improved performance. Therefore, it is important to design and develop a protective layer in order to provide a lithium metal negative electrode with a stable interface.

DISCLOSURE

Technical Problem

The present disclosure is directed to providing a lithium metal secondary battery having a self-healing function by using a protective layer including a polymer having a sulfur chain group as a protective layer for a lithium metal negative electrode to form a chemically stable sulfide-based interface on the surface of the lithium metal negative electrode and to prevent rapid growth of lithium dendrite at a specific position. The present disclosure is also directed to providing a battery module including the lithium metal secondary battery.

Technical Solution

The present disclosure is designed to solve the problems of the related art. According to the first embodiment of the present disclosure, there is provided a lithium metal secondary battery including: an electrode assembly including a positive electrode, a negative electrode, a separator interposed between the positive electrode and the negative electrode and a protective layer interposed between the negative electrode and the separator; a non-aqueous electrolyte impregnating the electrode assembly, wherein the negative electrode includes lithium metal, and the protective layer includes a polymer having a sulfur chain group.

According to the second embodiment of the present disclosure, there is provided the lithium metal secondary battery as defined in the first embodiment, wherein the polymer comprising sulfur chain group is a product of a nucleophilic substitution reaction between a sulfate group-containing polymer and lithium polysulfide, wherein the lithium polysulfide has the formula $Li_2S_n$, wherein $0<n<10$.

According to the third embodiment of the present disclosure, there is provided the lithium metal secondary battery as defined in the second embodiment, wherein the sulfate group-containing polymer includes a carrageenan polymer.

According to the fourth embodiment of the present disclosure, there is provided the lithium metal secondary battery as defined in the third embodiment, wherein the carrageenan polymer includes λ-carrageenan.

According to the fifth embodiment of the present disclosure, there is provided the lithium metal secondary battery as defined in any one of the first to the fourth embodiments, wherein the protective layer includes (a) a porous polymer layer or (b) a porous combined layer including a binder resin mixed with an inorganic material, as a protective layer substrate, and the polymer having a sulfur chain group is introduced to the protective layer substrate.

According to the sixth embodiment of the present disclosure, there is provided the lithium metal secondary battery as defined in any one of the first to the fifth embodiments, wherein the non-aqueous electrolyte includes $LiNO_3$ as an additive.

According to the seventh embodiment of the present disclosure, there is provided the lithium metal secondary battery as defined in any one of the first to the sixth embodiments, wherein the protective layer has a thickness of 0.1 μm to 100 μm.

According to the eighth embodiment of the present disclosure, there is provided the lithium metal secondary battery as defined in any one of the first to the seventh embodiments, wherein the protective layer includes a protective layer substrate, wherein the protective layer substrate includes a polyvinylidene-based polymer resin containing a vinylidene polymerization unit.

According to the ninth embodiment of the present disclosure, there is provided the lithium metal secondary battery as defined in any one of the first to the eighth embodiments, wherein the protective layer further includes inorganic particles, wherein the inorganic particle includes at least one selected from the group consisting of $BaTiO_3$, $SrTiO_3$, $SnO_2$, $CeO_2$, MgO, NiO, CaO, ZnO, $ZrO_2$, $Y_2O_3$, $Al_2O_3$, $TiO_2$, and SiC.

According to the tenth embodiment of the present disclosure, there is provided the lithium metal secondary battery as defined in any one of the first to the ninth embodiments, wherein the protective layer has a porosity of 5 vol % to 95 vol %.

Advantageous Effects

According to the present disclosure, the lithium metal negative electrode includes a polymer having a sulfur chain group as a protective layer, and thus it is possible to form a chemically stable sulfide-based interface on the surface of the lithium metal negative electrode, thereby preventing rapid growth of lithium dendrite. Ultimately, it is possible to improve the safety of a battery.

Such a sulfur chain group undergoes reduction instead of lithium metal, and thus prevents an excessive concentration of reaction at a specific position, and provides a self-healing function by preventing deterioration of the protective layer.

In addition, such a sulfur chain group is fixed in the polymer and only a predetermined amount thereof required for reaction is cleaved, and then participates continuously in the reaction.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Figure 1:
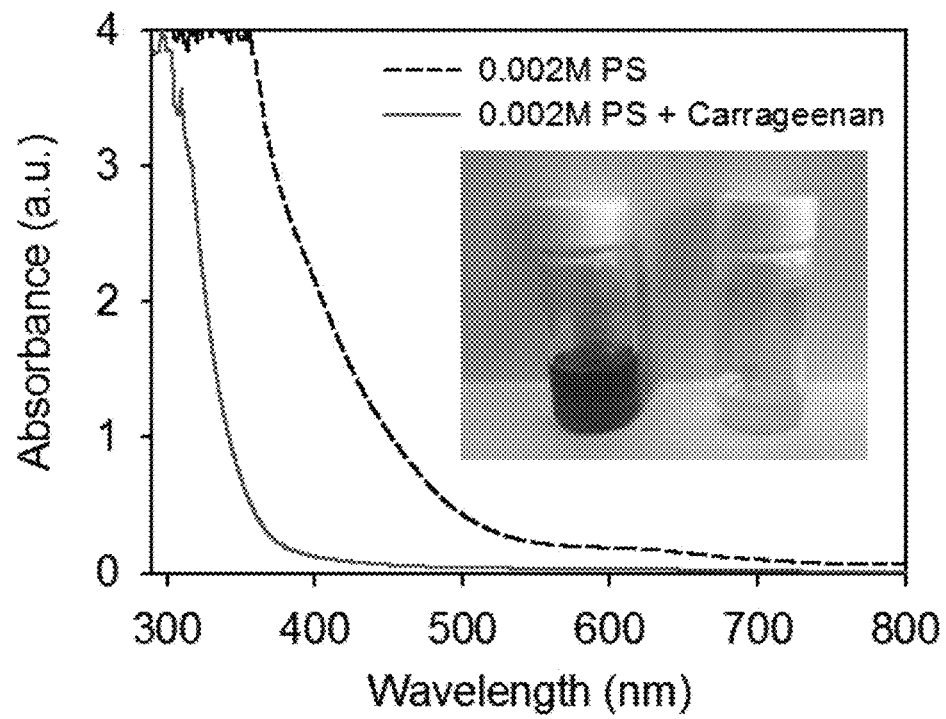
FIG. 1 illustrates reactivity with λ-carrageenan polymer as determined through a color change in the lithium polysulfide solution and UV-Vis analysis.

Hereinafter, preferred embodiments of the present disclosure will be described in detail with reference to the accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a lithium metal secondary battery including: an electrode assembly including a positive electrode, a lithium metal negative electrode and a separator interposed between the positive electrode and the lithium metal negative electrode; and a non-aqueous electrolyte impregnating the electrode assembly, wherein the lithium metal secondary battery further includes a protective layer interposed between the lithium metal negative electrode and the separator, and the protective layer includes a polymer having a sulfur chain group.

According to the present disclosure, the polymer having a sulfur chain group can form a chemically stable sulfide-based interface on the surface of the lithium metal negative electrode, thereby preventing rapid growth of lithium dendrite. Ultimately, it is possible to improve the battery safety.

In addition, such a sulfur chain group undergoes reduction instead of lithium metal, and thus prevents excessive concentration of reaction at a specific position and provides a self-healing function by preventing deterioration of the protective layer.

Further, such a sulfur chain group is fixed in the polymer and only a predetermined amount thereof required for reaction is cleaved, and then participates continuously in the reaction.

Herein, the polymer having a sulfur chain group may be a product of a nucleophilic substitution between a sulfate group ($SO_4^{2-}$)-containing polymer and lithium polysulfide ($Li_2S_n$). According to an embodiment of the present disclosure, n may be a number satisfying 0<n<10. The sulfate group ($SO_4^{2-}$) is a good leaving group and spontaneously causes nucleophilic substitution with lithium polysulfide ($Li_2S_n$). Through the reaction, a polymer having a substituted sulfur chain group can be formed. The following Reaction Scheme 1 shows structural formula of an embodiment of carrageenan having a substituted sulfur chain group formed by nucleophilic substitution of carrageenan molecule.

[Reaction Scheme 1]

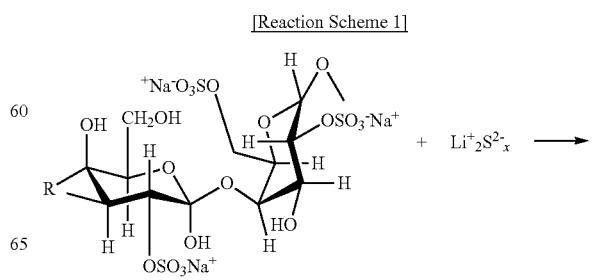

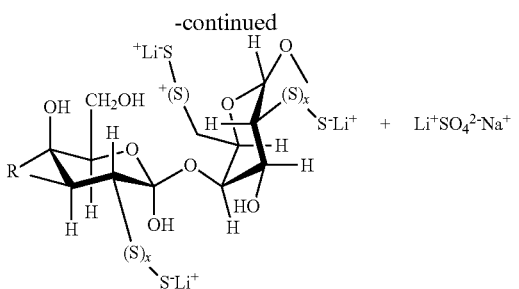

Herein, the sulfate group-containing polymer may be a carrageenan polymer, but is not limited thereto. In addition, the carrageenan polymer may be κ-carrageenan, ι-carrageenan or λ-carrageenan. Most preferably, the carrageenan polymer may be λ-carrageenan.

Herein, the non-aqueous electrolyte may further include $LiNO_3$ as an additive. By virtue of the presence of $LiNO_3$, it is possible to form a more stable sulfide-based interface having high conductivity on the surface of the lithium metal negative electrode.

The protective layer according to the present disclosure functions to inhibit growth of dendrites that may occur on the surface of a negative electrode and to prevent chemical reactions between an electrolyte and a negative electrode.

According to the present disclosure, the protective layer may include a polymer material, an inorganic material or both, and may have properties as a porous layer including pores. The protective layer may have a structure of porous polymer layer, porous inorganic layer, porous combined layer mixed with a binder resin and inorganic material or composite porous layer including a porous polymer layer laminated with a porous inorganic layer, depending on its components.

According to an embodiment of the present disclosure, the protective layer may use a porous polymer layer including a polymer or a porous combined layer mixed with a binder resin and inorganic material, as a protective layer substrate. In addition, a polymer having a sulfur chain group may be introduced to the protective layer substrate.

As mentioned above, since the protective layer according to the present disclosure has a porous structure, it facilitates impregnation of an electrolyte into a negative electrode active material layer, even when it covers the surface of the negative electrode active material layer. In addition, when an electrolyte is injected after manufacturing an electrode assembly, the protective layer may hold the electrolyte sufficiently therein. Further, since the protective layer sufficiently holds the electrolyte therein, it is possible to delay depletion of the electrolyte during the operation of a lithium metal secondary battery, and thus to delay degradation of the life of a lithium metal secondary battery.

Meanwhile, methods for introducing a polymer having a sulfur chain group to the protective layer may include, but are not limited to: a method for subjecting a protective layer substrate to dip coating with a solution containing an adequate amount of polymer having a sulfur chain group dissolved therein.

Any solvent may be used with no particular limitation, as long as it can dissolve the polymer having a sulfur chain group and does not affect the properties of the polymer. Particular examples of the solvent include water, methanol, ethanol, propanol, isopropanol, acetone, dimethyl formamide, dimethyl acetamide, chloroform, dichloromethane, trichloroethylene, n-hexane or a mixture thereof. For example, the solvent may include at least one of methanol, ethanol, propanol, isopropanol and acetone.

Herein, the solution containing a polymer having a sulfur chain group dissolved therein may have a concentration of 0.1 wt % to 2.0 wt %, preferably 0.2 wt % to 1.0 wt %, and more preferably 0.6 wt % to 0.8 wt %. When the concentration is less than 0.1 wt %, it is not possible to provide a sufficient effect of adding a polymer having a sulfur chain group. When the concentration is larger than 2.0 wt %, the protective layer shows a decrease in ion conductivity due to the polymer having a sulfur chain group and cycle life characteristics may be degraded undesirably.

According to an embodiment of the present disclosure, the protective layer may have a pore diameter size of 0.01 μm to 10 μm. Meanwhile, the protective layer may have a porosity of 5 vol % to 95 vol %. Preferably, the porosity may be 25 vol % to 70 vol % in terms of holding an electrolyte. The porosity and pore size may be determined with an adsorption gas, such as nitrogen, by using BELSORP (BET apparatus) available from BEL JAPAN Co., or by using mercury intrusion porosimetry or capillary flow porosimetry. According to another embodiment of the present disclosure, the porosity may be calculated by measuring the thickness and weight of the resultant coating layer and using the theoretical density of the coating layer.

According to an embodiment of the present disclosure, methods for forming the porous structure of the protective layer are not particularly limited. For example, in the case of a porous polymer layer, the polymer resin may be mixed with a pore-forming agent, such as polycarbonate or wax, to form a film shape, and then the pore-forming agent may be removed to form pores at the sites from which the pore forming agent is removed. In addition, the protective layer substrate may be prepared in the form of a porous combined layer further including inorganic particles in terms of forming pores and improving mechanical properties. In addition to the above-mentioned method, a porous protective layer may be formed through a dry process, wet process, phase separation process or a phase transformation process.

According to an embodiment of the present disclosure, the polymer resin that may be used in the protective layer is not particularly limited, as long as it can impart porous properties to the protective layer and can perform the above-described functions as a protective layer. For example, the polymer resin may include a polyvinylidene-based polymer resin containing a vinylidene polymerization unit. Particular examples of the polyvinylidene-based polymer resin include at least one of polyvinylidene, polyvinylidene-co-hexafluoropropylene and polyvinylidene-co-trichloroethylene, but are not limited thereto. In addition, the polymer resin may include at least one of polyolefin resin, polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene, in combination with or independently from the above-mentioned polyvinylidene-based polymer resin.

According to an embodiment of the present disclosure, the inorganic particles that may be contained in the protective layer are not particularly limited, as long as they can impart porous properties to the protective layer, can perform the above-mentioned functions as a protective layer, and cause no oxidation and/or reduction in the operating voltage range (e.g. 0-5V based on $Li/Li^+$) of a battery. Particular examples of the inorganic particles include at least one of $BaTiO_3$, $SrTiO_3$, $SnO_2$, $CeO_2$, MgO, NiO, CaO, ZnO, $ZrO_2$, $Y_2O_3$, $Al_2O_3$, $TiO_2$ and SiC. There is no particular limitation in the particle diameter of inorganic particles, and an adequate particle size may be selected considering the thickness, porosity and pore size of the protective layer.

According to an embodiment of the present disclosure, the thickness of the protective layer is not particularly limited, but may be 0.1 µm to 100 µm. According to an embodiment of the present disclosure, the thickness of the protective layer may be 0.1 µm or more, 0.2 µm or more, 1 µm or more, 10 µm or more, or 15 µm or more, and 70 µm or less, 50 µm or less, 30 µm or less, 10 µm or less, 8 µm or less, or 5 µm or less, within the above-defined range. For example, the thickness of the protective layer is 10 µm to 50 µm. Within the range of 0.1 µm to 100 µm, the protective layer can hold an electrolyte sufficiently, and thus it is possible to delay the problem of depletion of the electrolyte during the operation of a battery and to improve the life characteristics of a lithium metal secondary battery. When the thickness of the protective layer is less than 0.1 µm, it is not possible to perform functions as a protective layer. When the thickness of the protective layer is larger than 100 µm, electrode resistance is increased undesirably.

As described above, the battery according to the present disclosure includes an electrode, particularly a negative electrode, the surface of which is coated with the above-described protective layer. Thus, when lithium dendrite is grown through the gaps in the pores of the protective layer or defects of the protective layer, a sulfide-based passivation layer is formed on the surface of lithium dendrite to provide an effect of inhibiting additional growth of lithium dendrite. In other words, the sulfur chain group of the polymer contained in the protective layer reacts with lithium dendrite to produce byproducts, such as lithium sulfide ($Li_2S$) or lithium disulfide ($Li_2S_2$), and lithium dendrite is coated with a passivation layer including such byproducts. Herein, when $LiNO_3$ is present, a passivation layer having higher chemical stability may be formed. Therefore, it is possible to prevent lithium metal from corrosion caused by an electrolyte and to reduce generation of dead lithium, i.e. lithium that cannot participate in charge/discharge cycles. As a result, it is possible to reduce the irreversible capacity of a negative electrode.

Meanwhile, the positive electrode according to the present disclosure may be obtained by applying a mixture of a positive electrode active material, a conductive material and a binder onto a positive electrode current collector, followed by drying. If desired, the mixture may further include a filler.

In general, the positive electrode current collector is formed to have a thickness of 3 µm to 500 µm. The positive electrode current collector is not particularly limited, as long as it causes no chemical change in the corresponding battery and has high conductivity. Particular examples of the positive electrode current collector may include stainless steel, aluminum, nickel, titanium, baked carbon, aluminum or stainless steel surface-treated with carbon, nickel, titanium or silver, or the like. In addition, fine surface irregularities may be formed on the surface of the current collector to increase the adhesion of the positive electrode active material. The current collector may have various shapes, such as a film, sheet, foil, net, porous body, foam, non-woven body, or the like.

The conductive material is added generally in an amount of 1-50 wt % based on the total weight of the mixture including the positive electrode active material. The conductive material is not particularly limited, as long as it causes no chemical change in the corresponding battery and has conductivity. Particular examples of the conductive material include: graphite, such as natural graphite or artificial graphite; carbon black, such as acetylene black, Ketjen black, channel black, furnace black, lamp black or thermal black; conductive fibers, such as carbon fibers or metallic fibers; conductive tubes; such as carbon nanotubes; metal powder, such as carbon fluoride, aluminum or nickel powder; conductive whisker, such as zinc oxide or potassium titanate; conductive metal oxide, such as titanium oxide; and conductive materials, such as polyphenylene derivatives.

The binder assists binding between the positive electrode active material and the conductive material and binding to the current collector. In general, the binder is added in an amount of 1 wt % to 50 wt % based on the total weight of the mixture including the positive electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The filler inhibits swelling of the positive electrode and is used optionally. The filler is not particularly limited, as long as it causes no chemical change in the corresponding battery and is a fibrous material. Particular examples of the filler include olefinic polymers, such as polyethylene or polypropylene; and fibrous materials, such as glass fibers or carbon fibers.

The positive electrode active material used herein may include any one of lithium metal oxides and lithium-free metal oxides or a mixture of two or more of them. Lithium metal oxides used currently as a positive electrode active material are capable of initial discharge. However, it is possible to incorporate lithium-free metal oxides, which are inexpensive and ensure safety, partially to a positive electrode, or it is possible to apply 100% of lithium-free metal oxides.

Herein, particular examples of such lithium-free metal oxides include vanadium oxide, manganese oxide, nickel oxide, cobalt oxide, niobium oxide, iron phosphate, or the like.

Meanwhile, the negative electrode includes a negative electrode current collector and an electrode active material layer formed on the negative electrode current collector, wherein the electrode active material layer includes lithium metal. According to an embodiment of the present disclosure, the negative electrode may include a negative electrode current collector and a lithium metal layer formed on the negative electrode current collector. The lithium metal layer includes sheet-like metal and has a width controllable depending on the electrode shape to facilitate manufacture of the electrode. The lithium metal layer may have a thickness of 0 µm to 300 µm. In a variant, the lithium metal layer may be formed by electrodeposition, such as vapor deposition, of lithium metal or application of lithium metal powder. According to an embodiment of the present disclosure, even when no lithium metal layer is formed on the negative electrode current collector, lithium ions are transported from the positive electrode during charge to produce a lithium metal layer on the surface of the negative electrode current collector, which allows operation as a lithium metal secondary battery.

In addition, non-limiting examples of the negative electrode current collector include foil made of copper, gold, nickel or copper alloy, or a combination thereof.

In addition, similar to the positive electrode current collector, it is possible to reinforce the binding force to lithium metal by forming fine surface irregularities on the surface of the negative electrode current collector. The negative electrode current collector may have various shapes, such as a film, sheet, foil, net, porous body, foam and a non-woven web body.

The separator used in the lithium metal secondary battery according to the present disclosure is interposed between the positive electrode and the negative electrode, and is an electrically insulating thin film having high ion permeability and mechanical strength.

The separator may include a porous polymer substrate. The porous polymer substrate may be any porous polymer substrate used conventionally for a lithium secondary battery, and particular examples thereof include a polyolefin-based porous membrane or non-woven web, but are not limited thereto.

Particular examples of the polyolefin-based porous membrane may include those formed of polymers including polyethylene, such as high-density polyethylene, linear low-density polyethylene, low-density polyethylene and ultra-high-molecular weight polyethylene, polypropylene, polybutylene and polypentene, alone or in combination.

In addition to the polyolefin-based non-woven web, particular examples of the non-woven web may include those formed of polymers including polyethylene terephthalate, polybutylene terephthalate, polyester, polyacetal, polyamide, polycarbonate, polyimide, polyetherether ketone, polyether sulfone, polyphenylene oxide, polyether sulfone, polyphenylene oxide, polyphenylene sulfide, polyethylene naphthalene, or the like, alone or in combination. The non-woven web structure may be a spun-bonded non-woven web or a melt blown non-woven web including long fibers.

The thickness of the porous polymer substrate is not particularly limited but may be 1 μm to 500 μm, 3 μm to 300 μm, or 5 μm to 50 μm.

In addition, the size of the pores present in the porous polymer substrate and the porosity are not particularly limited. However, the pore diameter size and porosity may be 0.001 vol % to 50 μm and 10 vol % to 95 vol %, respectively.

In addition, the electrolyte salt contained in the non-aqueous electrolyte that may be used in the present disclosure is a lithium salt. Any lithium salt used conventionally for an electrolyte for a lithium secondary battery may be used with no particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Particular examples of the organic solvent that may be contained in the non-aqueous electrolyte may include those conventionally used for an electrolyte for a lithium secondary battery with no particular limitation. For example, it is possible to use ethers, esters, amides, linear carbonates or cyclic carbonates, alone or in combination.

Typical examples of the organic solvent may include carbonate compounds, such as cyclic carbonates, linear carbonates or mixtures thereof.

Particularly, ethylene carbonate and propylene carbonate, which are cyclic carbonates among the carbonate organic solvents, are organic solvents having high viscosity and a high dielectric constant, and thus can dissociate the lithium salt in the electrolyte well. In addition, it is possible to prepare an electrolyte having high electrical conductivity, when using such cyclic carbonates in combination with low-viscosity low-dielectric constant linear carbonates, such as dimethyl carbonate and diethyl carbonate, at an adequate ratio.

Further, among the organic solvents, particular examples of the ethers may include any one selected from the group consisting of dimethyl ether, diethyl ether, dipropyl ether, methyl ethyl ether, methyl propyl ether and ethyl propyl ether, or a mixture of two or more of them, but are not limited thereto.

Among the organic solvents, particular examples of the esters include any one selected from the group consisting of methyl acetate, ethyl acetate, propyl acetate, methyl propionate, ethyl propionate, γ-butyrolactone, γ-valerolactone, γ-caprolactone, σ-valerolactone and ε-caprolactone, or a mixture of two or more of them, but are not limited thereto.

Injection of the electrolyte may be carried out in an adequate step during the process for manufacturing a lithium secondary battery depending on the manufacturing process of a final product and properties required for a final product. In other words, injection of the electrolyte may be carried out before the assemblage of a lithium secondary battery or in the final step of the assemblage of a lithium secondary battery.

The lithium secondary battery according to the present disclosure may be subjected to a lamination or stacking step of a separator with electrodes and a folding step, in addition to the conventional winding step. In addition, the battery casing may be a metallic can, or a pouch-type battery casing of a laminate sheet including a resin layer and a metal layer.

In another aspect of the present disclosure, there is provided a battery module including two or more unit cells and a module casing configured to receive the unit cells, wherein each of the unit cells is the lithium metal secondary battery according to the present disclosure. There are also provided a battery pack including the battery module and a device including the battery pack as a power source.

Herein, particular examples of the device may include, but are not limited to: power tools driven by an electric motor; electric cars, including electric vehicles, hybrid electric vehicles, plug-in hybrid electric vehicles, or the like; electric carts, including electric bikes and electric scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

1. PREPARATION EXAMPLE

Preparation of Carrageenan Polymer Having Sulfur Chain Group

To 0.002 M lithium polysulfide solution (0.002 M $Li_2S_8$ in dimethoxyethane (DME)), λ-carrageenan polymer was introduced.

Figure 2:
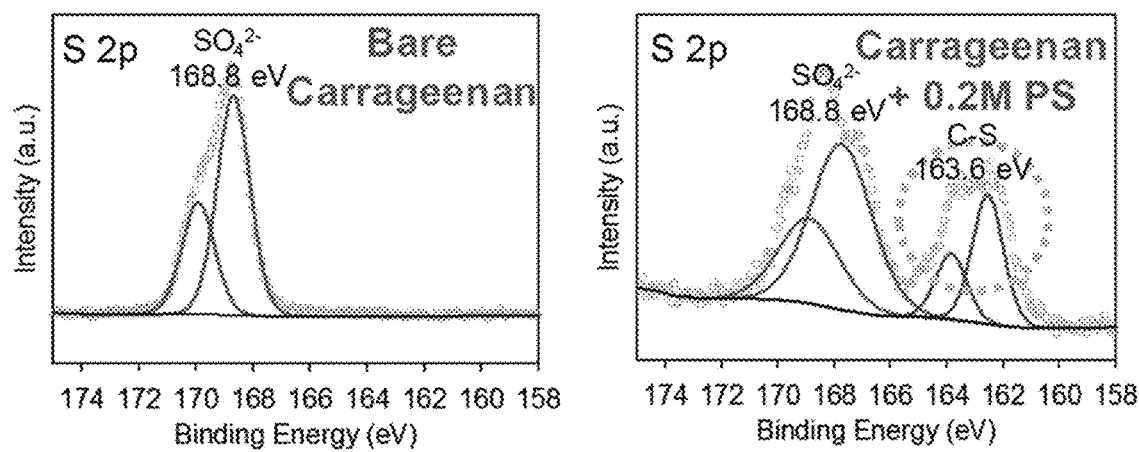
FIG. 2 is a graph of X-ray photoelectron spectroscopy (XPS) before and after reaction of lithium polysulfide solution with λ-carrageenan polymer.

FIG. 1 illustrates reactivity with λ-carrageenan polymer as determined through a color change in lithium polysulfide solution and UV-Vis analysis, and FIG. 2 is a graph of X-ray photoelectron spectroscopy before and after reaction of lithium polysulfide solution with λ-carrageenan polymer.

Referring to FIGS. 1 and 2, the solution to which carrageenan polymer was added showed a change in color and absorbance depending on wavelength. This suggests that reaction occurred between both materials.

In addition, it can be seen from the XPS graph before and after reaction between both materials that nucleophilic substitution occurred between the sulfate group of λ-carrageenan polymer and the lithium polysulfide solution to form a carrageenan polymer having a sulfur chain group.

2. COMPARATIVE EXAMPLE

Polyvinylidene fluoride-co-hexafluoropropylene (PVDF-co-HFP) polymer, aluminum oxide ($Al_2O_3$) and propylene carbonate (PC) were mixed at a weight ratio of 1:4:1, and the resultant mixture was introduced to dimethyl acetamide (DMAC) and the solution was agitated homogeneously. The resultant solution was cast onto a glass plate by using a doctor blade to a thickness of 150 μm. The resultant plate was vacuum-dried at room temperature to allow evaporation of DMAC and then introduced to a distilled water bath to remove PC. In addition, the resultant film was vacuum dried at 60° C. for 2 days to remove the remaining water completely, thereby providing a free-standing protective layer (thickness: about 30 μm).

The resultant protective layer was attached onto lithium foil having a thickness of 150 μm through a roll press inside of an argon glove box, and then cut into a disc shape to obtain an electrode. The resultant electrodes were used as a positive electrode and a negative electrode and a separator (polypropylene-based porous polymer substrate) was interposed between both electrodes to obtain a coin-cell. Then, an electrolyte containing 1M $LiPF_6$ and 0.2M $LiNO_3$ dissolved in a solvent containing a mixture of ethylene carbonate (EC) and ethyl methyl carbonate (DEC) at a volume ratio of 30:70 was injected to the coin-cell to obtain a symmetric lithium cell.

3. EXAMPLE 1

Polyvinylidene fluoride-co-hexafluoropropylene (PVDF-co-HFP) polymer, aluminum oxide ($Al_2O_3$) and propylene carbonate (PC) were mixed at a weight ratio of 1:4:1, and the resultant mixture was introduced to dimethyl acetamide (DMAC) and the solution was agitated homogeneously. The resultant solution was cast onto a glass plate by using a doctor blade to a thickness of 150 μm. The resultant plate was vacuum-dried at room temperature to allow evaporation of DMAC and then introduced to a distilled water bath to remove PC. In addition, the resultant film was vacuum dried at 60° C. for 2 days to remove the remaining water completely, thereby providing a free-standing protective layer. After drying, the resultant protective layer had a thickness of about 30 μm and a porosity of about 40%. Then, the resultant polymer film was dip coated with a solution containing the carrageenan polymer having a sulfur chain group and obtained from Preparation Example, dissolved in water to a concentration of 0.2 wt %, to obtain a protective layer including the carrageenan polymer having a sulfur chain group. The finished protective layer had a thickness of about 30 μm.

The resultant protective layer was attached onto lithium foil having a thickness of 150 μm through a roll press inside of an argon glove box, and then cut into a disc shape to obtain an electrode. The resultant electrodes were used as a positive electrode and a negative electrode and a separator (polypropylene-based porous polymer substrate) was interposed between both electrodes to obtain a coin-cell. Then, an electrolyte containing 1M $LiPF_6$ and 0.2M $LiNO_3$ dissolved in a solvent containing a mixture of ethylene carbonate (EC) and ethyl methyl carbonate (DEC) at a volume ratio of 30:70 was injected to the coin-cell to obtain a symmetric lithium cell.

4. EXAMPLE 2

A symmetric lithium cell was obtained in the same manner as Example 1, except that the protective layer was dip coated with a solution containing the carrageenan polymer having a sulfur chain group, dissolved in water to a concentration of 0.4 wt %, when the carrageenan polymer having a sulfur chain group was introduced to the protective layer.

5. EXAMPLE 3

A symmetric lithium cell was obtained in the same manner as Example 1, except that the protective layer was dip coated with a solution containing the carrageenan polymer having a sulfur chain group, dissolved in water to a concentration of 0.6 wt %, when the carrageenan polymer having a sulfur chain group was introduced to the protective layer.

6. EXAMPLE 4

A symmetric lithium cell was obtained in the same manner as Example 1, except that the protective layer was dip coated with a solution containing the carrageenan polymer having a sulfur chain group, dissolved in water to a concentration of 0.8 wt %, when the carrageenan polymer having a sulfur chain group was introduced to the protective layer.

7. EXAMPLE 5

A symmetric lithium cell was obtained in the same manner as Example 1, except that the protective layer was dip coated with a solution containing the carrageenan polymer having a sulfur chain group, dissolved in water to a concentration of 1.0 wt %, when the carrageenan polymer having a sulfur chain group was introduced to the protective layer.

8. EVALUATION OF LIFE CHARACTERISTICS OF LITHIUM METAL SECONDARY BATTERY

Each of the cells was subjected to the initial charge/discharge cycle at a current density of 0.1 mA/cm$^2$ for 10 hours in each time of charge and discharge, and then subjected to charge/discharge cycles at a current density of 1 mA/cm$^2$ for 1 hour in each time of charge and discharge.

Figure 3:
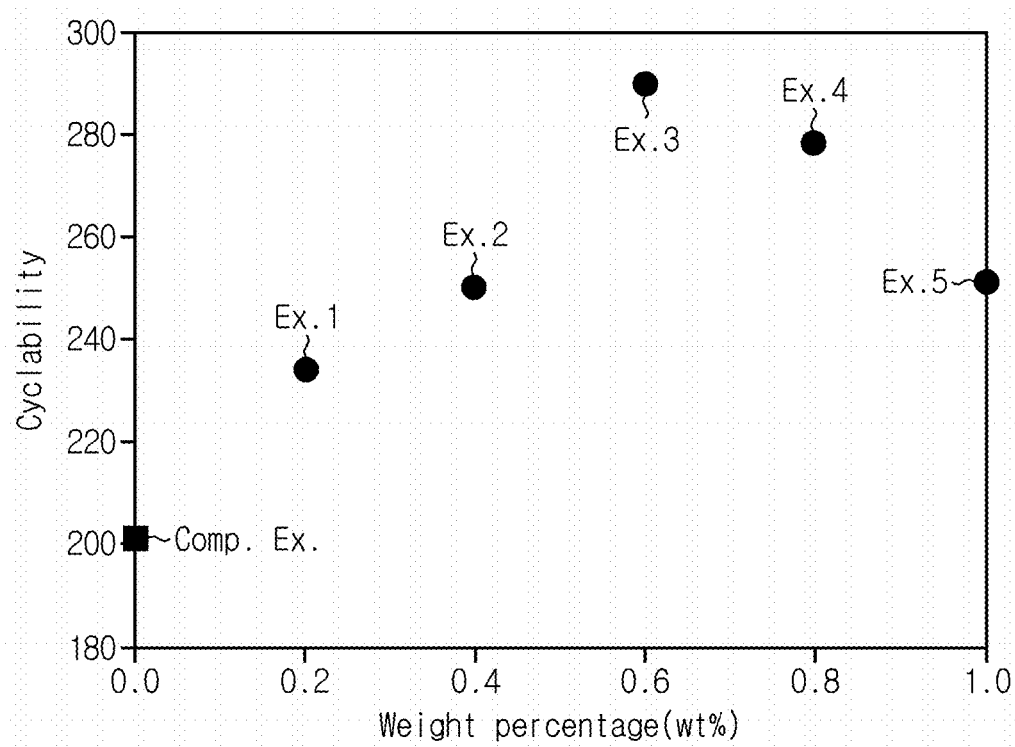
FIG. 3 is a graph illustrating the cycle number until a short-circuit occurs due to dendrite after operating each of the cells according to Examples and Comparative Example.
Figure 4:
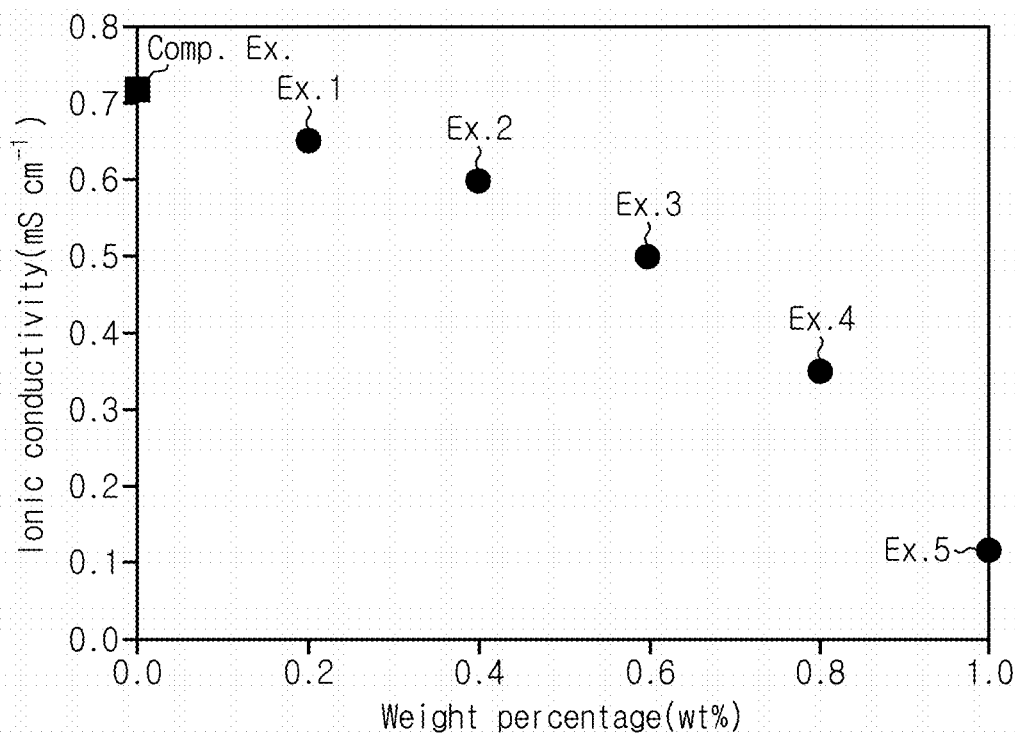
FIG. 4 is a graph illustrating the ion conductivity of each of the protective layers according to Examples and Comparative Example.

FIG. 3 is a graph illustrating the cycle number until a short-circuit occurs due to dendrite after operating each of the cells according to Examples and Comparative Example, and FIG. 4 is a graph illustrating the ion conductivity of each of the protective layers according to Examples and Comparative Example.

Referring to FIGS. 3 and 4, it can be seen that the cell cycle number tends to be increased, as the concentration of carrageenan polymer solution having a sulfur chain group is increased to the concentration of Example 3. However, when the concentration is increased to the concentration of Example 4 or more, the cell cycle number is decreased as compared to Example 3. It is thought that this is because the ion conductivity of the protective layer is reduced as the content of carrageenan polymer having a sulfur chain group is increased, as can be seen from FIG. 4.

In other words, the carrageenan polymer having a sulfur chain group has an effect of inhibiting dendrites, and thus improves cycle life as its content is increased. However, when the content of carrageenan polymer having a sulfur chain group reaches a predetermined level or higher, overvoltage derived from the low ion conductivity of the protective layer more significantly affects the battery, resulting in degradation of cycle life.

It should be understood that the detailed description is given by way of illustration only and various changes and modifications may be made without departing from the scope of the invention as defined in the following claims. Therefore, the embodiments disclosed herein are not intended to limit the scope of the present disclosure but are for illustrative purposes only, and the scope of the present disclosure is not limited thereto. It should be also understood that the scope of the present disclosure is defined by the following claims and all equivalents thereof are also included in the scope of the present disclosure.

What is claimed is:

1. A lithium metal secondary battery comprising:
an electrode assembly comprising a positive electrode, a negative electrode, a separator interposed between the positive electrode and the negative electrode, and a protective layer interposed between the negative electrode and the separator;
a non-aqueous electrolyte impregnating the electrode assembly,
wherein the negative electrode comprises lithium metal,
wherein the protective layer comprises a polymer having a sulfur chain group,
wherein the polymer comprising the sulfur chain group is a product of a nucleophilic substitution reaction between a sulfate group-containing polymer and lithium polysulfide, and
wherein the lithium polysulfide has the formula $Li_2S_n$, wherein $0<n<10$.

2. The lithium metal secondary battery according to claim 1, wherein the sulfate group-containing polymer comprises a carrageenan polymer.

3. The lithium metal secondary battery according to claim 2, wherein the carrageenan polymer comprises $\lambda$-carrageenan.

4. The lithium metal secondary battery according to claim 1, wherein the protective layer comprises a protective layer substrate, said protective layer substrate comprising (a) a porous polymer layer or (b) porous combined layer comprising a binder resin mixed with an inorganic material, wherein the polymer comprising the sulfur chain group is introduced to the protective layer substrate.

5. The lithium metal secondary battery according to claim 1, wherein the non-aqueous electrolyte comprises $LiNO_3$ as an additive.

6. The lithium metal secondary battery according to claim 1, wherein the protective layer has a thickness of 0.1 µm to 100 µm.

7. The lithium metal secondary battery according to claim 1, wherein the protective layer comprises a protective layer substrate,
wherein the protective layer substrate comprises a polyvinylidene-based polymer resin comprising a vinylidene polymerization unit.

8. The lithium metal secondary battery according to claim 7, wherein the protective layer further comprises inorganic particles,
wherein the inorganic particle comprises at least one selected from the group consisting of $BaTiO_3$, $SrTiO_3$, $SnO_2$, $CeO_2$, MgO, NiO, CaO, ZnO, $ZrO_2$, $Y_2O_3$, $Al_2O_3$, $TiO_2$, and SiC.

9. The lithium metal secondary battery according to claim 1, wherein the protective layer has a porosity of 5 vol % to 95 vol %.

10. The lithium metal secondary battery according to claim 2, wherein the protective layer comprises the carrageenan polymer having a sulfur chain group in a concentration of 0.1 wt % to 2.0 wt %.

* * * * *